United States Patent
Duesterwald et al.

(10) Patent No.: US 8,943,464 B2
(45) Date of Patent: Jan. 27, 2015

(54) CONTINUOUS UPDATING OF TECHNICAL DEBT STATUS

(71) Applicant: International Business Machines Corporation, Armonk, NY (US)

(72) Inventors: Evelyn Duesterwald, Pleasantville, NY (US); Tamir Klinger, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 13/785,009

(22) Filed: Mar. 5, 2013

(65) Prior Publication Data

US 2014/0258966 A1 Sep. 11, 2014

(51) Int. Cl.
*G06F 9/44* (2006.01)

(52) U.S. Cl.
CPC ...... *G06F 8/70* (2013.01); *G06F 8/20* (2013.01)
USPC ........... 717/102; 717/101; 717/103; 717/104; 717/105

(58) Field of Classification Search
None
See application file for complete search history.

(56) References Cited

U.S. PATENT DOCUMENTS

| | | | |
|---|---|---|---|
| 6,219,805 B1 | 4/2001 | Jones et al. | |
| 7,734,685 B2 | 6/2010 | Cheng et al. | |
| 8,126,581 B2 | 2/2012 | Kostyk et al. | |
| 8,151,248 B1 | 4/2012 | Butler et al. | |
| 2005/0076064 A1* | 4/2005 | Thomas et al. | 707/200 |
| 2008/0092108 A1* | 4/2008 | Corral | 717/101 |
| 2010/0180259 A1* | 7/2010 | Lindley | 717/124 |
| 2010/0191731 A1* | 7/2010 | Rus et al. | 707/737 |
| 2011/0225565 A1* | 9/2011 | van Velzen et al. | 717/114 |
| 2011/0251868 A1 | 10/2011 | Mikurak | |
| 2012/0089410 A1 | 4/2012 | Mikurak | |
| 2012/0192142 A1* | 7/2012 | Schimpf et al. | 717/101 |
| 2012/0297364 A1* | 11/2012 | Wehrwein | 717/123 |

FOREIGN PATENT DOCUMENTS

WO  2007030633 A2  3/2007

OTHER PUBLICATIONS

Carolyn Seaman, "Using Technical Debt in Decision Making: Potential Decision Approaches" [online] 2012 [retrieved on Aug. 1, 2014] retrieved from internet <http://delivery.acm.org/10.1145/2670000/2666044/p45-seaman.pdf?ip=151.207.250.51&id=2666044&acc=Active%20SERVICE&key=C1> 4 pages.*

(Continued)

*Primary Examiner* — Isaac T Tecklu
*Assistant Examiner* — Shirin Alizadeh
(74) *Attorney, Agent, or Firm* — Cantor Colburn LLP; Nidhi Garg

(57) ABSTRACT

A system and method to automatically and continuously update the urgency rating of a backlog item associated with a technical debt item in a software development project are described. The technical debt represents potential additional work or rework associated with current code. The method includes a user defining a plurality of components that comprise the software development project. The method also includes a processor associating the technical debt with one or more components of the plurality of components, and the processor updating the urgency of the backlog item associated with the technical debt according to a function based on a development event associated with at least one of the one or more components.

6 Claims, 4 Drawing Sheets

(56) References Cited

OTHER PUBLICATIONS

Steve McConnell, "Technical Debt" [online] 2007, [retrieved on Aug. 1, 2014] retrieved from internet <http://www.construx.com/10x_software_development/Technical_Debt/> 16 pages.*

Cedergren et al., "Towards Integrating Perceived Customer Value in the Evaluation of Performance in Product Development", Technology Management for Global Economic Growth (PICMET), 2010 Proceedings of PICMET, pp. 1-11.

Seaman et al., "Using Technical Debt Data in Decision Making: Potential Decision Approaches", Managing Technical Debt (MTD), 2012, pp. 1-4.

Snipes et al., "Defining the Decision Factors for Managing Defects: A Technical Debt Perspective", Managing Technical Debt (MTD), 2012, pp. 1-7.

Zimmerman et al., "Reference Architecture, Metamodel, and Modeling Principles for Architectural Knowledge Management in Information Technology Services", Journal of Systems and Software, 2012, pp. 1-11.

* cited by examiner

CONTINUOUS UPDATING OF TECHNICAL DEBT STATUS

BACKGROUND

The present invention relates generally to software development techniques, and more specifically, to updating the status of technical debt work items.

In a software development environment, technical debt refers to code that is incomplete in some way or inadequate to efficiently accommodate required changes and therefore represents the potential for additional work or re-work in the future. For example, to speed up time to solution, developers may have initially designed a user interface (UI) of a product by making a number of assumptions regarding usage context and "hard-wiring" those into the code. Over time, as the usage patterns of the product grow, the initial UI solution is found to be insufficient to support these growing usage patterns. That is, the initial UI design that proved too narrow a solution was technical debt that the developers took on. Technical debt items (e.g., a more robust UI) are entered in a backlog of work items. The priority of a particular backlog item may determine when that technical debt is addressed. For example, although the initial UI design was too narrow, the technical debt associated with that design may not present an issue if usage patterns remain unchanged throughout the lifecycle of the product. However, if usage patterns expand quickly beyond the initial design, the urgency of addressing the technical debt associated with the initial design may be high. Development organizations have begun to track the technical debt. Tools may presently assess the magnitude or size of technical debt. However, the decision of when to remediate a technical debt (backlog item) is left to members of the development team.

SUMMARY

According to one embodiment of the present invention, a method of automatically and continuously updating an urgency rating of a backlog item associated with a technical debt of a software development project, the technical debt representing potential additional work or rework associated with current code includes a user defining a plurality of components that comprise the software development project; a processor associating the technical debt with one or more components of the plurality of components; and the processor updating the urgency rating of the backlog item associated with the technical debt according to a function based on a development event associated with at least one of the one or more components.

According to another embodiment of the present invention, a system to continuously update an urgency rating of a backlog item associated with a technical debt of a software development project, the technical debt representing potential additional work or rework associated with current code includes a user interface configured to facilitate a user defining a plurality of components that comprise the software development project and a function to update the urgency rating based on a development event associated with a component among the plurality of components that is associated with the technical debt; and a processor configured to identify the development event and update the urgency rating based on the function.

According to yet another embodiment of the present invention, a computer program product stores computer-readable instructions which, when processed by a processor, cause the processor to implement a method of continuously updating an urgency rating of a backlog item associated with a technical debt item in a software development project, the technical debt representing potential additional work or rework associated with current code. The method includes initializing a state of a component of the software development project to which the technical debt applies; updating the state of the component based on activity involving the component; initializing the urgency rating of the backlog item; and updating the urgency rating based on a change in the state of the component.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, technical debt may be tracked by existing tools, but a decision regarding when the backlog item associated with the technical debt should be addressed is left up to the developers. For example, the project leader of a development team may periodically (e.g., at the beginning of a new development iteration) review the backlog items and determine which, if any, of those items should be addressed in the next development iteration. However, it would be difficult for that project leader to maintain knowledge of every relevant external event that affected the urgency of a backlog item. Further, regularly tracking and manually updating the urgency of backlog items to ready them for the periodic review would be a tedious process prone to error based on the knowledge of all relevant events on the part of the person doing the updating. As such, the prior systems that identify and track technical debt may be regarded as a starting point for embodiments of the present invention. Embodiments of the system and method described herein automatically and continuously update the urgency of technical debt work items in the backlog of a development project.

Figure 1:
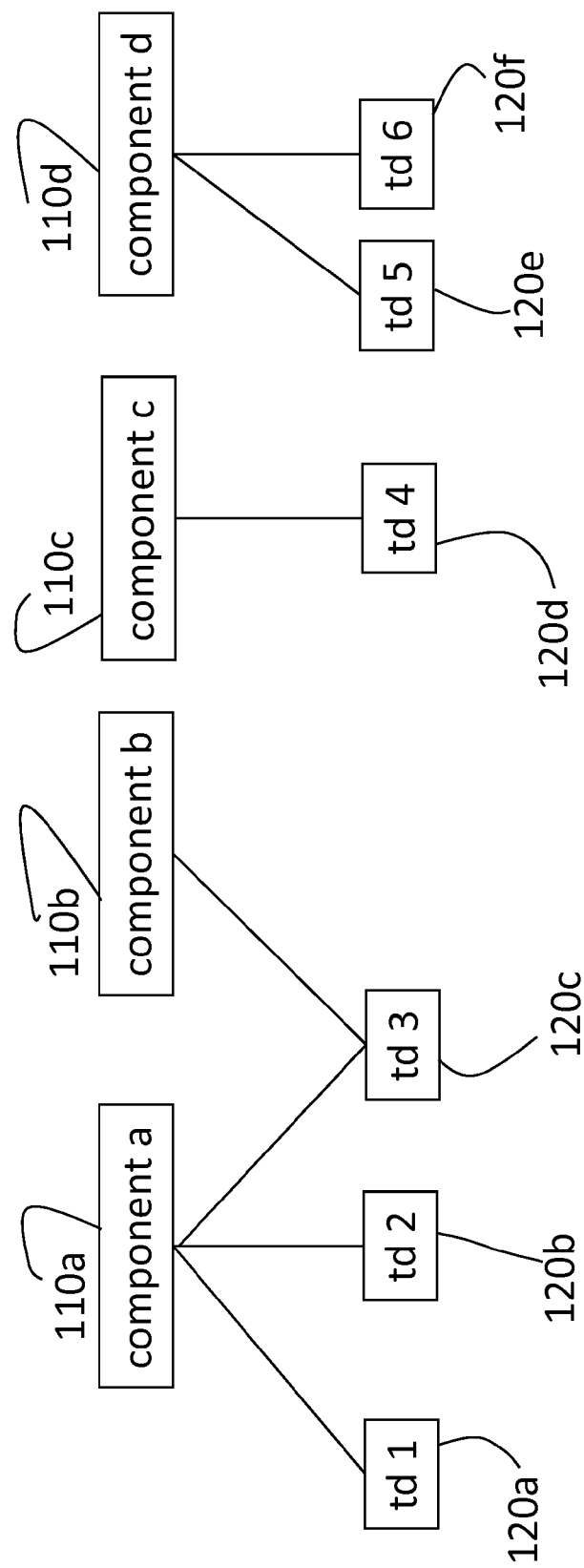
FIG. 1 illustrates an association between software components and technical debt according to an embodiment of the invention.

FIG. 1 illustrates an association between software components 110 and technical debt 120 according to an embodiment of the invention. Each component 110 represents a specified portion of the software development project. That is, the entire software development project is comprised of all of the components. A given component 110 may represent a file, for example. In alternate embodiment, code associated with an aspect of the overall project (e.g., code associated with the user interface) may be regarded as a component 110. Technical debt 120 may be associated with more than one component 110 (e.g., technical debt (td 3) 120c is associated with both component a 110a and component b 110b). In addition, a component 110 may have more than one technical debt 120 associated with it (e.g., component a 110a has technical debts (td1, td2, td3) 120a, 120b, 120c associated with it).

Figure 2:
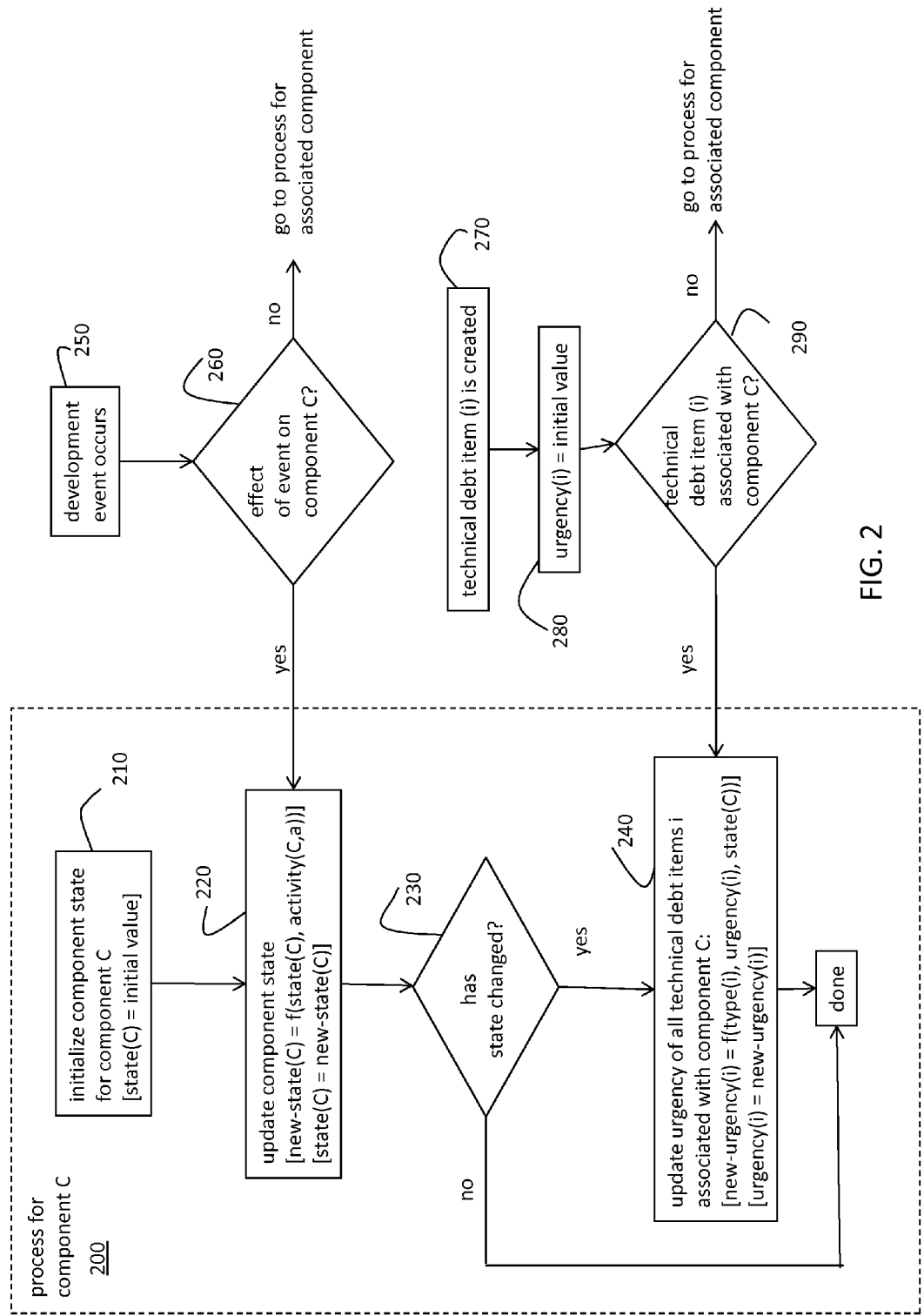
FIG. 2 is a flow diagram of a method of continuously updating urgency of a technical debt item according to an embodiment of the invention.

FIG. 2 is a flow diagram of a method of continuously updating urgency of a technical debt 120 item according to an embodiment of the invention. The process 200 associated with one of the components 110 (C) is shown. Similar processes are associated with each component 110 of the software development project. At block 210 initializing the component 110 state may be a same initial state for each component 110 of the software development project. When any development event occurs (250), it is determined whether the development event has an effect on the component 110 (C) at block 260. Exemplary development events include source code check-in, generation of a defect report, the creation of a task or enhancement planning item, and failure or success of a test case. Different types of development events affect the state of a component 110 differently. For example, the success of a test case (a type of development event) may have no impact on the state or urgency of a component 110. An activity associated with a component 110 is a measure of the number or kind of development events relating to that component 110. Based on the activity resulting from a given development event, the state of component 110 (C) is updated at block 220. The new state of component 110 (C) is a function of the current state and the development event that occurred (at block 250). The function to determine the new state is defined as discussed below in FIG. 3. At block 230, when it is determined that the state of the component 110 (C) has changed, the urgency is updated at block 240. The initial urgency is created (block 280) when a technical debt 120 item (i) is created (block 270). Whether the backlog item associated with technical debt 120 item (i) is associated with component 110 (C) is determined at block 290. After it has been determined that the technical debt 120 item (i) is associated with component 110 (C), each time the state of component 110 (C) has been determined to have changed (block 230), the urgency associated with the technical debt 120 item (i) is updated at block 240. Block 240 is processed to update the urgency of all technical debt 120 items associated with component 110 (C) when it is determined (block 230) that the state of the component 110 (C) has changed due to a development event associated with component 110 (C). At block 240, the new urgency for technical debt 120 items (i) associated with component 110 (C) is a function of the type of the technical debt 120 item (i), the current urgency of technical debt 120 item (i), and the current state of the component 110 (C). That is, every technical debt 120 item (i) associated with a component 110 (C) is not necessarily updated equally. The function to determine the new urgency is defined as discussed below in FIG. 3.

For simplicity, only one technical debt 120 item (i) is shown in association with the component 110 (C). However, as shown in FIG. 1, a single component 110 may have multiple technical debt 120 items associated with it. In that case, as noted above, a state update of a component 110 will trigger the update of the urgency for all technical debt 120 items associated with component 110 (C). That is, more than one block 290 may be associated with the update block 240 for component 110 (C)). As also shown in FIG. 1, a technical debt 120 may be associated with more than one component 110. In that case, the urgency of the technical debt 120 may be affected by more than one component 110 (output of block 290 may go to multiple processes 200 for the multiple components 110 associated with the technical debt).

FIG. 2 illustrates that the urgency of technical debt items associated with a given component 110 may be updated automatically by tracking the activity (resulting from development events) associated with that component 110. That is, increased activity associated with a component 110 that is burdened with technical debt 120 may be seen as increasing the cost of not addressing the shortcomings associated with the technical debt 120. For example, creating patches or temporary fixes are activities directly resulting development events that are necessitated by the inadequate code (technical debt 120). Thus, the more such activity is performed, the more urgent it is that the associated technical debt 120 be addressed to essentially fix the code once and for all. The activity associated with a given component 110 may be tracked through a number of development events. For example, the audit trail produced by a source code management system may be used to determine when a development event has occurred (block 250 has been reached). The creation of defect reports in a defect tracking tool may be another exemplary indicator of a development event. New defect reports relating to a component 110 may increase the activity for that component 110 and in turn trigger a state update (block 220). In addition, project management and planning tools include enhancement or development task items that relate to components 110. Additional task items relating to a component 110 indicate increased activity for that component 110.

Figure 3:
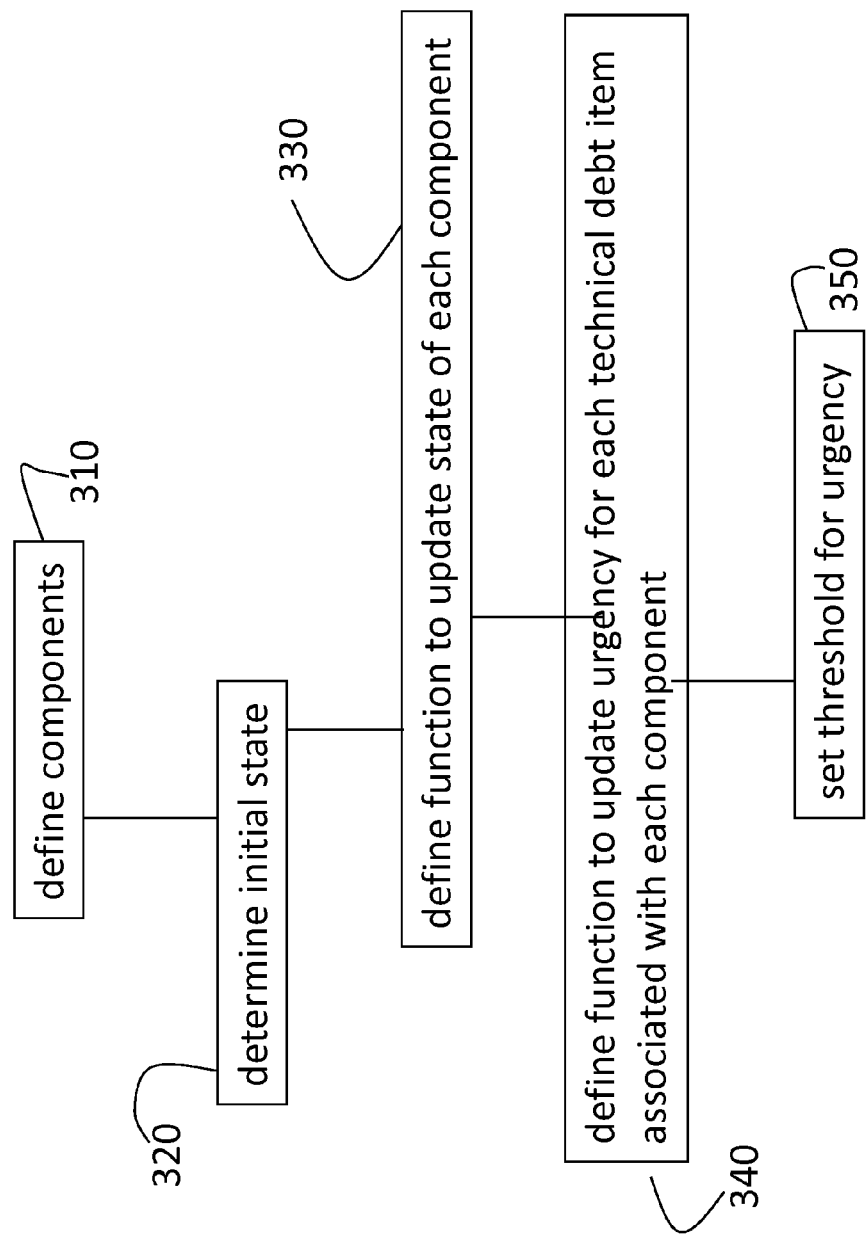
FIG. 3 is a flow diagram of a method of establishing the automated process shown in FIG. 2 to process technical debt items according to an embodiment of the invention.

FIG. 3 is a flow diagram of a method of establishing the automated process shown in FIG. 2 to process technical debt 120 items according to an embodiment of the invention. As noted above, a technical debt 120 or backlog item may be associated with one or more components 110. At block 310, defining components 110 of a software development project establishes the level of granularity at which technical debt 120 is tracked. That is, the more narrowly a component 110 is defined, the fewer technical debt 120 items are likely to be associated with that component 110. On the other hand, when a component 110 is defined broadly, it may have several technical debt 120 items associated with it. Technical debt items associated with such a broadly defined component 110 may reach a level of urgency sooner than technical debts items associated with a more narrowly defined component 110. At block 320, determining the initial state of a component 110 may be the same for every component. In alternate embodiments, certain components 110 may be defined with a different initial state to reflect their importance or lack of importance as the case may be. At block 330, defining the function (used at block 220 of FIG. 2) to update the state of each component 110 may be the same or different for different components 110. Further, the function may be defined to be weighted such that certain development events change the state differently than other development events. At block 340, defining the function (used at block 240 of FIG. 2) to update the urgency of technical debts items associated with each component 110 may be the same or different for different components 110. Also, the function may be defined to be weighted such that the urgency is updated differently based on the change in state (determined at block 230 of FIG. 2). That is, when the state update is weighted (based on the function defined at block 330), certain changes in state (e.g., certain types of development events) may trigger certain changes in the urgency update (based on the function defined at block 340) so that, for example, development events or types of development events that may be pre-identified as requiring an urgent addressing of technical debt 120 may be handled appropriately rather than like all other development events and corresponding activities for the associated components 110. At block 350, setting the threshold for urgency relates to determining when an updated urgency (updated at block 240 of FIG. 2) should trigger addressing the technical debt (i.e., when the backlog item(s) for the component code should be put on the development iteration).

Figure 4:
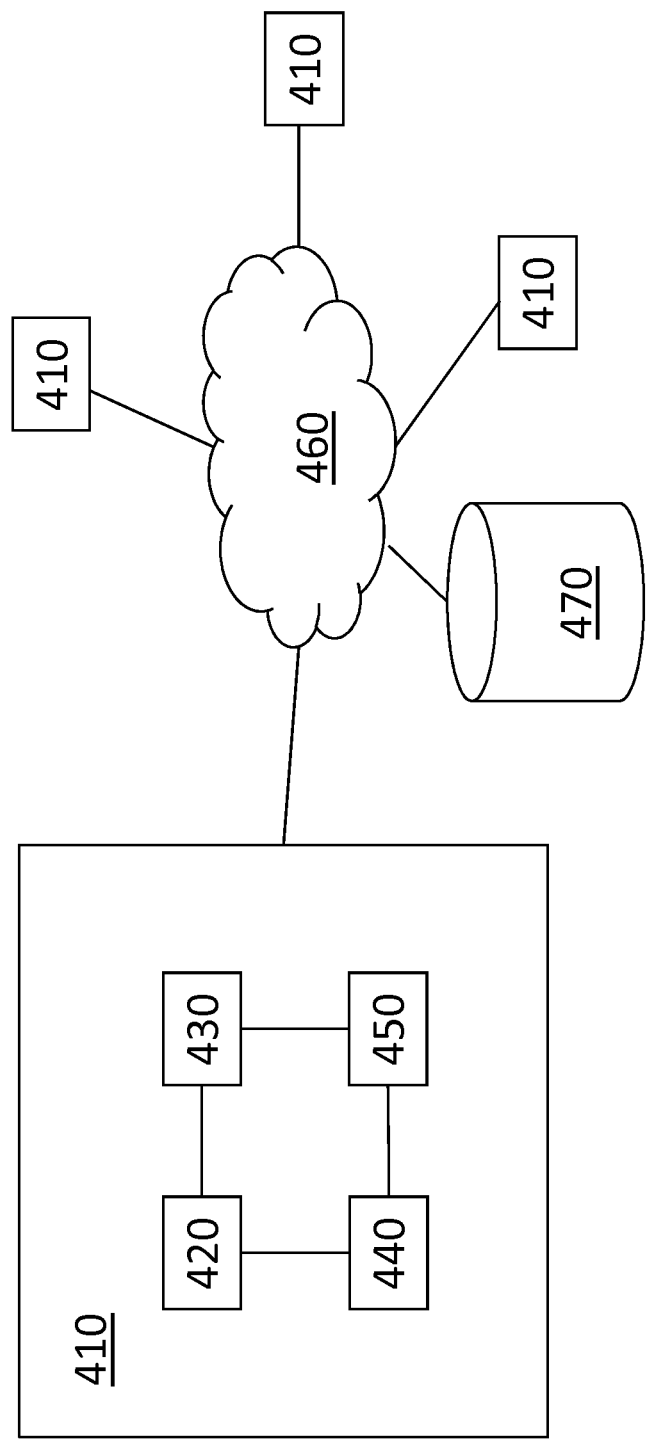
FIG. 4 is a block diagram of an exemplary software development environment according to an embodiment of the invention.

FIG. 4 is a block diagram of an exemplary software development environment according to an embodiment of the invention. More than one machine 410 may be used and may communicate with other machines 410 and one or more storage devices or servers 470 via a network 460. The machines may communicate via an internet, intranet, or extranet through a network 460 that may be one or more of a cellular, satellite, or other interface. Each machine 410 may include one or more processors 420, memory devices 430, user interfaces 430, and output devices 450. The process shown in FIG. 2 may be implemented by the one or more processors 420 of a single machine 410 or multiple machines 410. The process shown in FIG. 3 may be implemented by one or more users using a user interface 430.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of automatically and continuously updating an urgency rating of a backlog item associated with a technical debt of a software development project, the technical debt representing potential additional work or rework associated with current code, the method comprising:
   defining a plurality of components that comprise the software development project;
   associating, with a processor, the technical debt with one or more components of the plurality of components; and
   updating, with the processor, the urgency rating of the backlog item associated with the technical debt according to a function based on a development event associated with at least one of the one or more components;
   initializing a state for each of the plurality of components and defining a second function for updating the state based on the development event, wherein the function to update the urgency rating uses the output of the second function.

2. The method according to claim 1, further comprising defining the function.

3. The method according to claim 2, wherein the function is defined to update the urgency rating differently based on a type of the development event.

4. The method according to claim 1, further comprising identifying the development event using a source code management system.

5. The method according to claim 1, further comprising identifying the development event using one of a defect tracking tool, a project management tool, or a planning tool.

6. The method according to claim 5, wherein the identifying the development event is based on an audit trail produced by a source code management system, a creation of a defect report in the defect tracking tool, or a creation of an addition or enhancement task item in the project management tool or the planning tool.

* * * * *